UNITED STATES PATENT OFFICE.

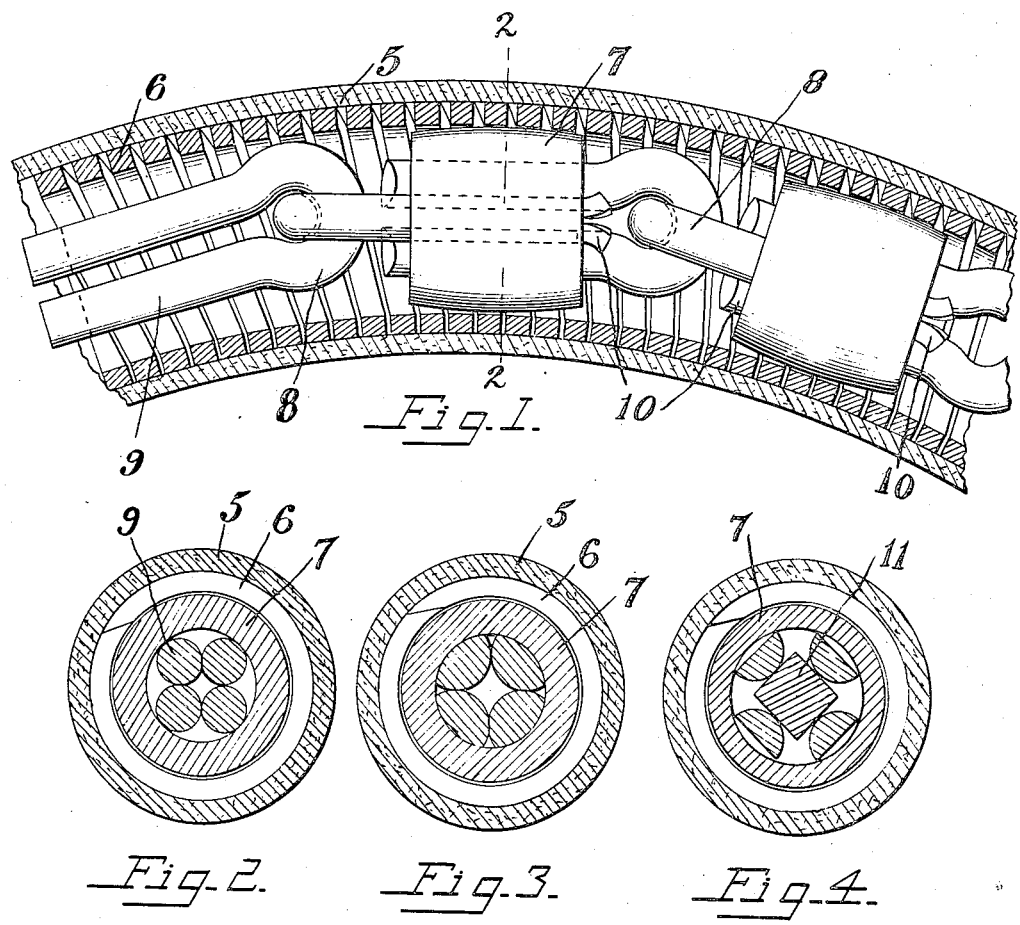

SPENCER HEATH, OF BALTIMORE, MARYLAND.

FLEXIBLE SHAFT.

1,245,229.  Specification of Letters Patent.  Patented Nov. 6, 1917.

Application filed March 18, 1914. Serial No. 825,537.

*To all whom it may concern:*

Be it known that I, SPENCER HEATH, a citizen of the United States, a resident of Baltimore, in the State of Maryland, have invented certain new and useful Improvements in Flexible Shafts, of which the following is a specification.

This invention relates to flexible shafting and has for its object the production of a simple, strong and effective inner revolving member for flexible shafts.

A further object is to produce a flexible shaft inner member which can be readily assembled or taken apart.

A further object is to produce a flexible shaft inner member that can be formed from ordinary rolled, formed and bent material without the necessity for forging, milling or other expensive work in the formation of its links.

A further object is the production of a flexible shaft of the chain type in which the links or eyes of the chain will not come into frictional contact with the casing or outer member of the shaft.

A further object is to provide a flexible shaft inner member of the chain type in which there shall be ample circular bearing surfaces between the inner member and the outer member.

With these objects in view, and further objects which will appear, I have invented the flexible shaft inner member illustrated by the accompanying drawing forming a part of this specification, and in which—

Figure 1 is a longitudinal section through a portion of the complete shaft.

Fig. 2 is a section taken on the line 2—2 of Fig. 1.

Figs. 3 and 4 are alternating forms of Fig. 2.

Referring to the drawing, the flexible shaft is composed of an outer non-revolving member and an inner revolving member. The outer member comprises a casing 5, which contains a metallic lining 6 formed of helically wound square wire. The inner member is formed of a series of co-acting, linked units, each unit comprising a cylindrical friction member 7 and two similarly formed open-end links 8. The units are formed by pressing or driving two of the links 8 into the interior of the cylinder 7 from opposite ends thereof, the open ends of the links emerging slightly at the opposite ends of the cylinders. A series of these units, assembled and linked together as shown in Fig. 1, constitutes the inner revolving member. The cylinders 7 are tapered slightly from the center toward either end to accommodate their outer surface to the curved interior of the outer member when the shaft is bent.

Fig. 2 shows how the straight portions 9 of the opened links 8 are arranged inside of the friction member 7. This figure shows the links 8 formed from cylindrical rod or wire.

Fig. 3 shows how the straight portions of the links assemble within the friction member 7 when the links are formed of rod or wire of approximately half round section. With this form of wire the interior of the cylinders 7 is more completely occupied by the straight portion of the links, and the eye portions of the links which work together present to each other larger wearing surfaces (within the same exterior compass) than round wire links of similar size.

Fig. 4 shows the straight portions of the links of smaller cross sectional area than in Figs. 2 and 3 so that they much less completely fill the interior of the cylindrical friction member 7. The remaining space within the cylindrical member is occupied by the square plug or key 11 which bears against the wires of the links and holds them against the inner walls of the cylinder and equi-distant from each other.

To prevent the links becoming accidentally withdrawn from the friction members 7, the ends of the wire in each link are split for a short distance previous to assembling and where these ends emerge from the friction members 7, they are spread as shown at 10 in Fig. 1 to secure them within the friction member 7. They may be secured also by soldering.

The advantages of my improved inner member lie in the fact that the cylindrical bearing parts and the bent wires open links which form the units can be easily and cheaply produced and readily assembled without machine tooling or similar work.

A further advantage lies in the fact that the open ends of the links by their insertion in the cylindrical member become rigidly and securely fixed, thus giving the greatest possible strength to the eye portion of the links for transmitting the torque of the shaft.

As a further advantage, the ends 10 of the links may be squeezed together or the rivets 11 or 12 removed and the units readily opened for the replacement of a part or changing the length of the inner member.

Having now described my invention, what I claim is:

1. A flexible shaft unit comprising an annular member of rigid material, and two open-end links inserted oppositely and having overlapping ends and secured therein by frictional contact against the inner walls of said rigid annular member.

2. A flexible drive shaft unit comprising an annular member of rigid material, and two open-end links inserted oppositely and secured in position within said annular member by frictional contact against one another and against the inner walls of said annular member.

3. A flexible drive shaft unit comprising an annular member of rigid material, and open-end links inserted oppositely therein, the ends of said links being extended through said annular member and being deformed at a point beyond the end of said annular member to prevent withdrawal therefrom.

4. A flexible drive shaft unit comprising an annular member of rigid material, and open-end links inserted oppositely within said annular member, the ends of said links extending beyond the ends of said annular member and being split for a short distance adjacent thereto and said split ends being spread to prevent the withdrawal of said links from said annular member.

5. A flexible drive shaft unit comprising an annular member of substantially rigid material, and two open-end links inserted oppositely therein and having eyes and straight portions, said eyes being at opposite ends of said member and at right angles to each other and said straight portions each extending the full length of said annular member and retained therein by the frictional engagement of the straight portions with the inner wall of said annular member.

6. A flexible drive shaft unit comprising an annular member of substantially rigid material, and two open-end links inserted oppositely therein, each link being firmly held by frictional engagement against the inner wall of said annular member and throughout the length of said inner wall.

7. A flexible drive shaft unit comprising an annular member of substantially rigid material, and two open-end links inserted oppositely therein and retained therein by the frictional engagement against each other and against the inner wall of said annular member throughout the length thereof.

8. A flexible drive shaft unit comprising an annular member of substantially rigid material, and two open-end links inserted oppositely therein, each link being in frictional engagement with the inner wall of said annular member throughout the length thereof, the ends of said links being extended beyond the ends of said annular member and being deformed to prevent withdrawal therefrom.

9. A flexible drive shaft unit comprising an annular member and two open-end links inserted oppositely therethrough and at right angles to each other, the ends of said links extending beyond the ends of said annular member and being split to prevent the withdrawal of the same from said annular member.

10. A flexible drive shaft unit comprising a hollow annular member of substantially rigid material and two open-end links, each link having an eye portion and two extended portions, said extended portions lying within and in frictional engagement with the inner wall of said annular member and so arranged that the extended portions of each link are interspaced alternately with respect to the extended portions of the other link.

In testimony whereof I affix my signature in the presence of two witnesses.

SPENCER HEATH.

Witnesses:
NANCY C. LOENTAL,
EDNA L. HAMPTON.